(12) United States Patent
Huyard

(10) Patent No.: US 9,135,058 B2
(45) Date of Patent: Sep. 15, 2015

(54) METHOD FOR MANAGING TASKS IN A MICROPROCESSOR OR IN A MICROPROCESSOR ASSEMBLY

(75) Inventor: Olivier Huyard, Toulouse (FR)

(73) Assignee: CONTINENTAL AUTOMOTIVE FRANCE, Toulouse (FR)

( * ) Notice: Subject to any disclaimer, the term of this patent is extended or adjusted under 35 U.S.C. 154(b) by 354 days.

(21) Appl. No.: 13/819,182

(22) PCT Filed: Aug. 9, 2011

(86) PCT No.: PCT/EP2011/003973
§ 371 (c)(1),
(2), (4) Date: Apr. 2, 2013

(87) PCT Pub. No.: WO2012/038000
PCT Pub. Date: Mar. 29, 2012

(65) Prior Publication Data
US 2013/0185727 A1 Jul. 18, 2013

(30) Foreign Application Priority Data
Sep. 21, 2010 (FR) ..................................... 10 03747

(51) Int. Cl.
G06F 9/46 (2006.01)
G06F 9/48 (2006.01)

(52) U.S. Cl.
CPC ............... *G06F 9/48* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 6,009,454 A | * | 12/1999 | Dummermuth | ............... 718/108 |
| 2006/0031839 A1 | * | 2/2006 | Kang | ............................. 718/102 |
| 2011/0167245 A1 | * | 7/2011 | Lavrov et al. | ................. 712/220 |

OTHER PUBLICATIONS

Yinglong Xia et al.: "Hierarchical Scheduling of DAG Structured Computations on Manycore Processors with Dynamic Thread Grouping", Apr. 23, 2010. Job Scheduling Strategies for Parallel Processing, Springer Berlin Heidelberg. Berlin, Heidelberg, pp. 154-174, XP019154641, ISBN: 978-3-642-16504-7 p. 157, line 1—p. 162. last line, cited in ISR.
International Search Report, dated Feb. 12, 2011, from corresponding PCT application.
Michael Schobel et al.: "Kernel-Mode Scheduling Server for CPU Partitioning", A Case Study Using the Windows Research Kernel, SAC '08 Proceedings of the 2008 ACM symposium on Applied computing, 2008, pp. 1700-1704. XP002636316, New York, NY, USA.

\* cited by examiner

*Primary Examiner* — Sisley Kim
(74) *Attorney, Agent, or Firm* — Young & Thompson

(57) ABSTRACT

This method includes steps for the parallel management of a first list and of a second list. The first list corresponds to a list of tasks to be carried out. The second list corresponds to a list of variables indicating the presence or absence of tasks to be carried out. The list of tasks is managed in a "FIFO" manner, that is to say that the first task inputted into the list is the first task to be executed. A task interruption is managed using a "Test And Set" function executed on the elements of the second list, the "Test And Set" function being a function which cannot be interrupted and including the following steps: reading the value of the element in question, storing the read value in a local memory, and assigning a predetermined value to the element which has just been read.

10 Claims, 3 Drawing Sheets

METHOD FOR MANAGING TASKS IN A MICROPROCESSOR OR IN A MICROPROCESSOR ASSEMBLY

Figure 1:
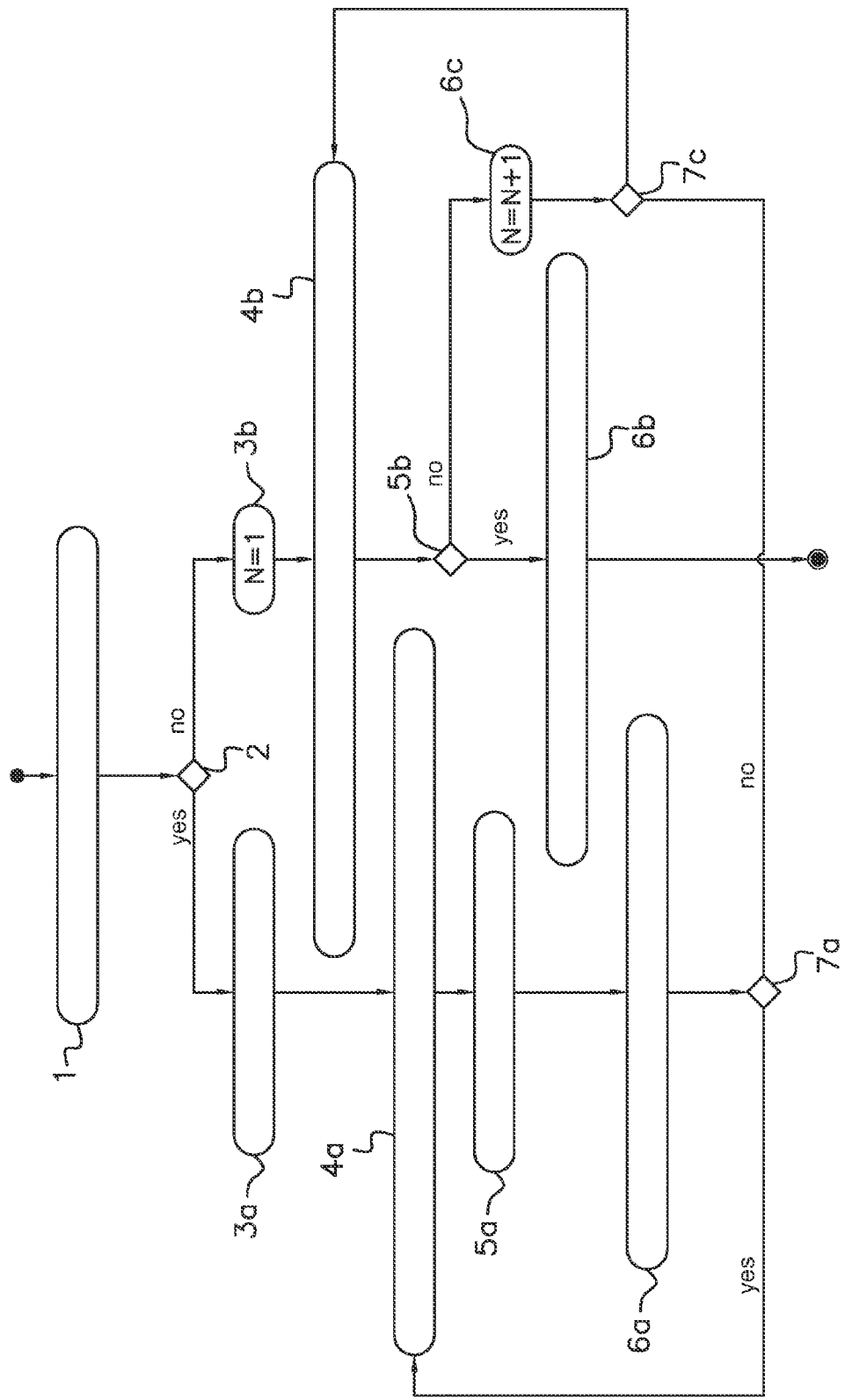

The present invention relates to a method for managing tasks in a microprocessor or in a microprocessor assembly, and more particularly a method managing the interruption of tasks in a microprocessor.

A microprocessor is an electronic device which can carry out various tasks, each task being a series of several instructions. Means are associated with the microprocessor in order to form a microcontroller with it. These additional means allow the management of the tasks assigned to the microprocessor.

A microprocessor usually performs only a single task at a time. It is therefore appropriate to manage the situations in which several tasks have to be executed simultaneously or the case where one or more tasks have to be executed whilst a preceding task is in the process of execution.

For example, provision is made for certain microprocessors to be able to interrupt a task in order to execute another one and to finish the interrupted task once the new task has been completed.

Such management is problematic notably when the execution of the tasks by the microprocessor uses accesses to a memory. The carrying out of the new task therefore risks disturbing the values stored for the task in the process of execution, which of course disturbs the task in progress and can result in inconsistencies due to the unstable state of the intermediate data.

In order to overcome these problems it is possible to simply prohibit any interruption. The risk is then that tasks are lost. It is also possible to use software for storing waiting tasks. Such software then manages a list of tasks which will hereafter be called "JobRow". With such software, the task in the process of execution is momentarily stopped, giving time for the software to list waiting tasks. Thus, during the execution of a task, the arriving tasks are stored by the intermediary of the software in the JobRow list and will be carried out once the task in the process of execution is completed.

This alternative raises problems however. If the interruption of execution of a piece of software is authorized, the interruption of the software managing the JobRow list is also authorized. Thus a task of the "JobRow management" type can be interrupted by a new task of the same type. The software managing a JobRow list can thus be interrupted by itself. In order to overcome this disadvantage, it is therefore appropriate to make provision for preventing any interruption of tasks during the operation of this software.

This task interruption management functions but has the disadvantage of slowing down the speed of execution of the tasks. In fact, these stops and restarts of tasks consume time. Moreover, authorizing these stops and restarts also increases the risk of making a human error during the writing of the software managing the "JobRow". Such an error can even result in blocking the system.

The purpose of the present invention is therefore to provide a method for managing tasks in a microprocessor, notably making it possible to also manage task interruptions, which allows good functioning of the system with execution of the tasks which is as fast as possible. It is particularly appropriate to avoid waste of time due to stops and restarts during task execution.

In certain systems, a resource is common to several microprocessors. Thus, several microprocessors are likely to access this resource, called a "shared resource", for the execution of the tasks assigned to them. This shared resource can however only be used by one single microprocessor at a time. It is therefore known to use "mutual exclusion" algorithms, also known by the term "mutex", for managing access to the shared resources.

Advantageously, the present invention will also make it possible to manage the successive accesses to a shared resource common to several microprocessors.

For this purpose, the present invention proposes a method for managing the processing of tasks in a microprocessor, characterized in that it comprises steps for the parallel management of a first list and of a second list, in that the first list corresponds to a list of tasks to be carried out, in that the second list corresponds to a list of variables indicating the presence or absence of tasks to be carried out, in that the list of tasks is managed in a "FIFO" (First In, First Out) manner, that is to say that the first task inputted into the list is the first task to be executed, and in that a task interruption is managed using a "Test And Set" function executed on the elements of the second list, the "Test And Set" function being a function which cannot be interrupted and comprising the following steps:

reading the value of the element in question, storing the read value in a local memory, assigning a predetermined value to the element that has just been read.

The original use of a "Test And Set" type function which cannot be interrupted at the same time as a task interruption makes it possible to retain consistent data and thus a correct running of tasks.

When it is a matter of a list of tasks, it is necessary to understand that the tasks are not necessarily listed but that pointers associated with tasks are the elements contained in that list. The elements of the list can be extended to any type of element which would allow the clear identification of a task to be executed (address, etc.).

The present invention also proposes a detailed algorithm for implementing such a method. It thus also proposes a method for managing the processing of tasks in a microprocessor, characterized in that it comprises steps for the management of a first list and of a second list, in that the first list is a list containing elements giving an indication of a task to be carried out by the microprocessor, in that the second list is a list of variables representative of a state, each variable of the second list being associated with one and only one element of the first list and able to take a first value representative of a first state and a second value representative of a second state, in that a global variable is defined, this global variable being able to take as many separate values as there are elements in the second list, said global variable making it possible to point to a variable in the first list and in the second list, in that said global variable is a variable intended to be incremented in such a way as to point to the elements of the first list and of the second list in a given order, the first list and the second list being considered as circular lists, that is to say that in said given order the first element of the list is considered as the element following the last element of the list and, conversely, the last element of the list is considered as the element preceding the first element of the list, in that the first step of the method, when a task called current task is assigned to the microprocessor, consists in reading the value of the second list pointed to by the global variable, in copying the read value into a first local variable and in writing in the second list, in place of the read value, the value representative of the second state, this first step forming a single operation, called "Test And Set" and which cannot be interrupted, in that said method implements a first sub-method in the case where the first local variable has taken the value representative of the first state and a second sub-method in the case where the first local variable has taken the value representative of the second state, in that the first sub-method comprises the following steps:
  3a) updating the first list such that the element corresponding to the local variable gives an indication corresponding to the current task,
  4a) the variable of the second list preceding the variable corresponding to the global value is set to the value representative of the first state,
  5a) executing the current task,
  6a) incrementing the global variable,
in that, after step 6a), the first sub-method returns to step 4a) if the value of the second list corresponding to the incremented global variable is representative of the second state, and the method is terminated if not,
in that the second sub-method comprises the following steps:
  3b) initializing a second local variable at the value 1, this second local variable being intended to be used for incrementing the global variable,
  4b) executing a "Test And Set" operation on the variable of the second list corresponding to the global variable incremented by the value of the second local variable, the read value being copied into a third local variable and the value representative of the second state being taken by the element of the second list corresponding to the global variable incremented by the value of the second local variable,
  5b) test on the third local variable and executing a step 6b) consisting in updating the first list such that the variable corresponding to the global variable incremented by the second local variable gives an indication corresponding to the current task and then the end of the method for managing tasks insofar as the result of the test on the third local variable indicates that the latter has a value representative of the first state, in the contrary case an incrementing of the second local variable is carried out followed by a return to step 4b) provided that the value of the second local variable is strictly less than a limit value corresponding to the number of elements of the second list reduced by 1, and end of the method with loss of the current task if this limit value is exceeded by the second local variable.

Such a method does not contain any part which cannot be interrupted. It can therefore be interrupted at any time during its execution and restart another execution. As mentioned before, the "Test And Set" function cannot of course be interrupted. It is also possible to provide for an interruption of this algorithm by itself.

The algorithm of the above method has two branches, one for the execution of the tasks, the other for the storage of new tasks to be executed. It makes it possible to ensure consistency of the values produced by the tasks in the process of execution without blocking the execution of the other tasks which arrive, this method being able to be interrupted at any time.

In this detailed method, the third local variable is advantageously merged with the first local variable. This makes it possible to multiply the number of variables to be managed.

Moreover, in order to favor speed of execution of a method according to the present invention, the variables of the second list are preferably Boolean variables.

The present invention also relates to a method for managing the processing of tasks in an assembly of at least two microprocessors. In this method, each microprocessor uses a method for managing tasks such as described above.

When, in addition, a shared memory is accessible by each microprocessor of the assembly in question, it is proposed:
  that a list of tasks common to the assembly of microprocessors is defined,
  that this list of tasks is managed in a "FIFO" manner, that is to say that the first task inputted into the list is the first task executed,
  that two indexes are defined in common for the assembly of microprocessors, a first index indicating which task is the next task to be executed and a second index indicating the location in the list of tasks which will have to be occupied by the next task inputted into the list of tasks to be carried out, the management of the list of tasks being carried out in a cyclic manner,
  that the access to the shared memory is managed by a "mutex" mechanism defining a variable whose value is representative of the state of the shared memory and using a "Test And Set" function executed on this latter variable, the "Test And Set" function being a function that cannot be interrupted and comprising the following steps:
    reading the value of the variable,
    storing the read value in a local memory,
    assigning a predetermined value to the variable that has just been read.

Such management in an assembly of microprocessors allows a consistent management of common resources (memory). The tasks can be executed one after the other according to their order of arrival in the list. However, with this management, when a task must be executed, it is not possible to know in advance which microprocessor of the assembly of microprocessors using the shared resource will execute that task.

The present invention also relates to a computer program stored on a data medium, said program comprising instructions allowing the implementation of a method of managing tasks such as described above, when that program is loaded and executed by a data processing system, such as a microprocessor.

Finally, the present invention also relates to a microprocessor, characterized in that it comprises instructions of a program allowing the implementation of a method of managing tasks such as described above.

Figure 2:
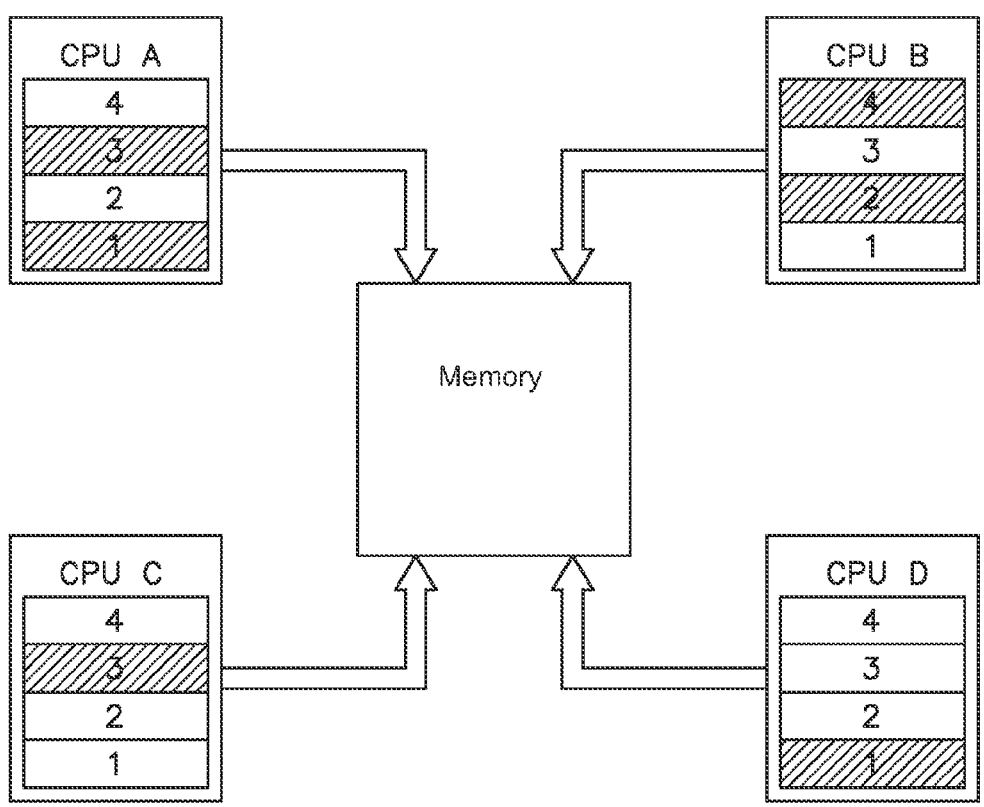
Figure 3:
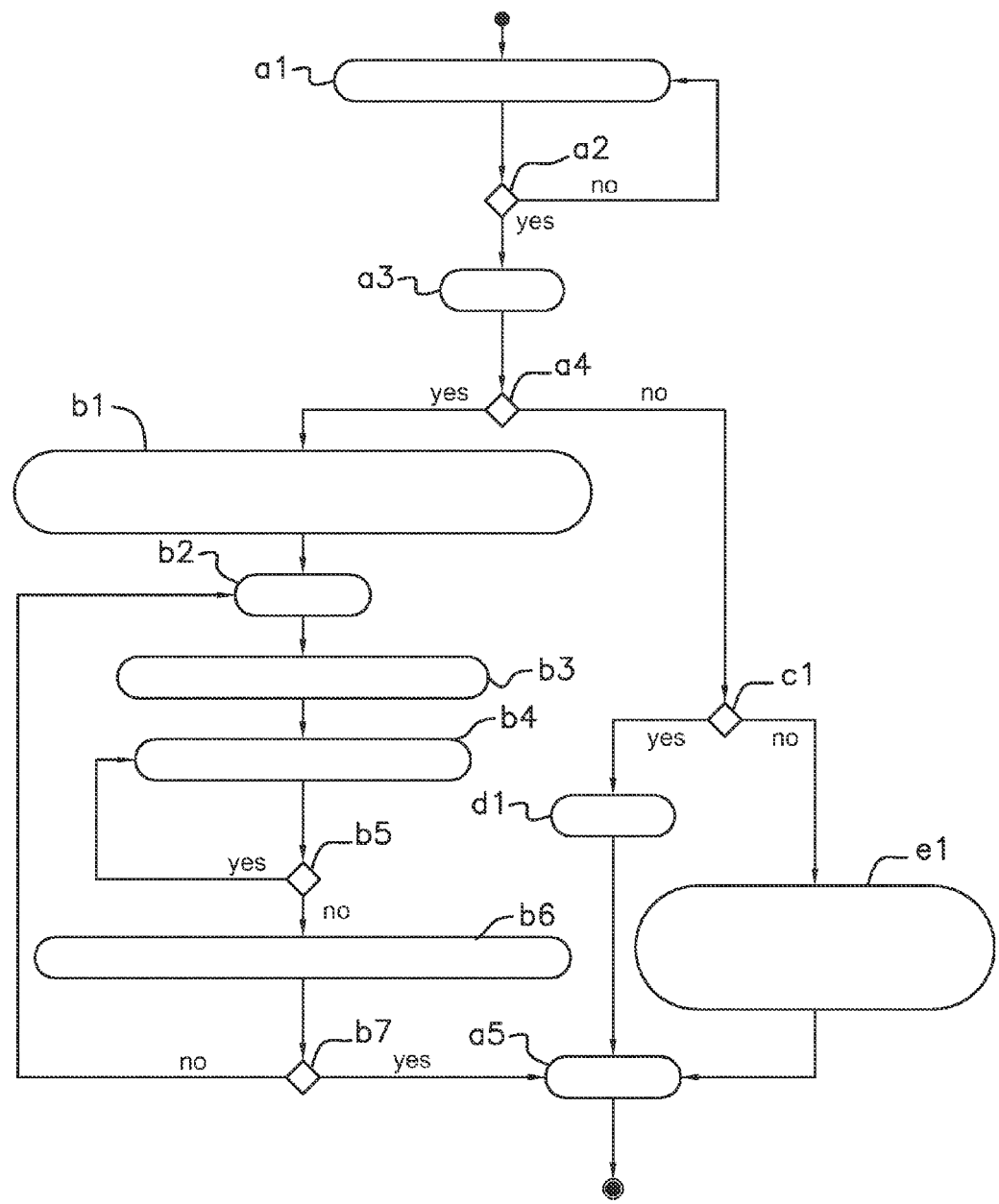

Details and advantages of the present invention will emerge better from the following description, given with reference to the diagrammatic drawings in which:

FIG. 1 is an algorithm illustrating a task management method according to the present invention, FIG. 2 is a block diagram of a memory shared by several microprocessors, and FIG. 3 shows an algorithm for managing the tasks of the microprocessors and the access to the shared memory shown diagrammatically in FIG. 2.

FIG. 1 shows an algorithm allowing the implementation of a preferred embodiment of a method for managing tasks according to the present invention. Various elements are used in this algorithm. Among these there are notably:

RowSize, being a variable which is an integer greater than two. It corresponds to the number of tasks able to be held waiting in the microprocessor.

r_index, being an integer able to take all of the values from 0 to (RowSize−1).

JobRow, being a list of elements which are RowSize in number. These elements can directly be tasks or can be a pointer indicating the location of a task, or any other element which makes it possible to define tasks, notably tasks to be executed.

TasRow, here being a list of variables, preferably Boolean variables. There are as many variables in this list as there are elements in JobRow. This list is the reflection of JobRow and makes it possible to know the positions of the tasks stored in JobRow.

Get, being a local variable, available solely in the microprocessor and a new copy of which is created each time the method is interrupted in its execution in order to be executed again from the beginning. It is preferably a Boolean variable.

N, here also being a local variable. Hereafter it will be assumed that this is an integer. As mentioned below, this local variable is used for reading the elements of TasRow.

When the program corresponding to the algorithm shown in FIG. 1 is initialized, r_index is set to zero as are all of the elements in the TasRow list.

The black dot at the top of FIG. 1 corresponds to the pointy of entry of the program which will be described below.

Step 1 implements a function hereafter called "Test And Set". It is a function which cannot be interrupted. In this case it will be applied to Boolean variables. This Test And Set function reads the Boolean variable, stores the value of this variable in a buffer memory, a local memory, and then gives the read Boolean variable a predetermined value, in this case the value 1. In step 1, the Test And Set function is applied to the element in the TasRow list having the index r_index. The value, 0 or 1, of this element of the TasRow list is then placed in the local memory Get and then the element in position r_index in TasRow takes the value 1.

In step 2, the value of Get is analyzed and, depending on the result obtained, the program executes the left hand branch of the algorithm or the right hand branch of this algorithm. The left hand branch of the algorithm makes it possible to execute the tasks whilst the right hand branch is used for storing the new tasks to be executed.

Thus, in step 3a, if the value of Get is 0, the task "Job" is placed in the JobRow list in position r_index.

Then, in step 4a, the position value preceding position r_index is then set to 0 in the TasRow list.

It should be noted here that the management of all the lists is a circular management (also in the following method relating to several microprocessors). Thus, for example, if RowSize is 10, r_index can vary between 0 and 9. Thus when r_index is equal to 9 and it is incremented by one unit, its value becomes 0. Such cyclic management of a list is entirely usual for those skilled in the art.

In the next step, step 5a, Job, which corresponds to the element placed in the JobRow list in position r_index, is executed. It is only when the task is completely executed that the variable r_index is incremented by one unit (step 6a).

In step 7a, the element of the TasRow list in position r_index is looked at, this position being the new incremented position. If the value of this element is 1, this signifies that a task has to be executed. In this case, the algorithm returns to step 4a. On the contrary, if there are no more tasks to be executed, the program is completed. The spot at the bottom of FIG. 1 represents the exit from the program corresponding to the algorithm.

The left hand branch of the algorithm having now been described, the right hand branch will be considered. This branch relates to the storage of tasks in the JobRow list of tasks.

At the input of the right hand branch, the local variable N is initialized at the value 1 in step 3b. Then, in step 4b, a Test And Set function is carried out on the element of the TasRow list in position r_index+N, modulo RowSize of course. A third local variable could be used here as a buffer memory. In fact, it is not useful to use a third variable here, the local variable Get being available for stacking the tasks assigned to the microprocessor and not able to be executed immediately. The result of the Test And Set function in step 4b is then recorded in the local variable Get. If the latter is then equal to 0 (step 5b), the position r_index+N is then free in the JobRow list and the Job task, which is the current task having initiated the program, is then stored in JobRow in position r_index+N (modulo RowSize of course). The task being in the waiting list, the program is therefore completed.

On the contrary, if in step 5b the value of Get is not 0, that is to say that it is equal to 1, it is appropriate to increment N by one unit in order to see if the next place in the JobRow task list is free. All of the places in the JobRow are then looked at until a free place is found (loop 4b, 5b, 6c, 7c, 4b). If the list of tasks is completely filled (step 7c), the current task "Job" is therefore lost. The program is then also completed.

The method for managing tasks which has just been described here has the advantage that it does not contain any part which is not interruptive. It is however recalled here that the Test And Set function cannot be interrupted. The method described above and illustrated in FIG. 1 can be interrupted at any time during its execution in order to restart another execution. In the case of interruption by itself, its execution is suspended until the next execution is finished.

The algorithm proposed here makes it possible to record tasks in the list of tasks as soon as a task in the process of execution is completed. The tasks are stored and read in their order of arrival. This is therefore "FIFO" (First In First Out) management.

The implementation of this algorithm makes it possible to provide consistency of the values produced by the tasks in the process of execution without blocking the other tasks which arrive since the corresponding method can be interrupted at any time. This consistency is notably obtained due to the fact that the algorithm used for the execution and storage of the tasks is based on a function, the Test And Set function, which is not interruptive and cannot therefore be interrupted.

The present invention also provides for managing tasks in an assembly of microprocessors, this assembly having a shared memory which each of the microprocessors of the assembly can access.

By way of non-limitative and simply illustrative example, FIG. 2 shows four microprocessors, called CPU A, CPU B, CPU C and CPU D. It is assumed here for example that these four microprocessors are all identical but of course the invention also functions with microprocessors which are not similar. A memory at the center of FIG. 2 contains data which can be accessed and modified by the four microprocessors of the assembly of microprocessors. It is assumed here, still by way of non-limitative example, that each microprocessor has four levels ("Level") of interruption.

For the consistency of the system, it is appropriate to provide a security mechanism which makes it possible to put on hold a task which should be executed when another task using common data is already in the process of execution. It is convenient here to manage several microprocessors with each of several levels of interruption. It is thus convenient to find a locking mechanism which makes it possible to provide consistency of data for the execution of each program. It is thus desired to ensure that the shared memory is accessed sequentially by all of the tasks, that is to say that each task is completed fully before another one is started. As shown by way of example in FIG. 2, it is desired to manage, for example, a situation where level 3 of CPU A, level 1 of CPU A, level 4 of CPU B, level 2 of CPU B, level 3 of CPU C and level 1 of CPU D necessitate access to the same memory at the same time.

The algorithm shown in FIG. 3 is intended for managing tasks for several microprocessors and for managing a memory shared between these microprocessors.

Here, it is firstly proposed that each of the microprocessors manages its tasks according to a method such as that described above with reference to FIG. 1. The method shown in FIG. 3 relates to managing tasks at the level of the assembly of microprocessors, that is to say in this case the microprocessors CPU A, CPU B, CPU V and CPU D.

The present invention here proposes using a common list of tasks, here also called JobRow. The same names as before will be used again here for similar elements. However, in the following description the elements relate to the assembly of microprocessors and the shared memory.

The method shown in the algorithm of FIG. 3 thus notably uses the following elements:

JobRow, already mentioned above. It is a list of tasks relating to the assembly of microprocessors, RowSize, being the number of elements that can be found in JobRow, r_index, being an integer variable that can reach RowSize value. It will be assumed here that r_index can take values from 0 to RowSize−1. As will be seen below, the method provides for reading the tasks in order to execute them on the one hand and, on the other hand, to place tasks to be executed in the list of tasks. The index r_index is used for reading (r standing for "read"), w_index, like r_index, is an integer variable able to take RowSize value. In practice, it will take the values from 0 to RowSize−1. This index w_index is used for stacking tasks in the JobRow list of tasks (w standing for "write"), mutex, this variable indicates the state of the shared memory. It is used notably for blocking access to this memory. In practice, a Boolean variable will be chosen for mutex, taking either the value 0 when the memory is accessible or the value 1 when the memory is blocked, Get, in this case this is a local variable which is here also preferably chosen to be a Boolean variable.

At the start, the variables are initialized by setting the values of r_index, w_index and mutex to 0. It is considered here that RowSize is at least equal to 3.

In the following method, the list of tasks, JobRow, is managed in a "FIFO" manner. The JobRow list is, as already mentioned previously, managed as a cyclic list. All of the tasks to be executed are grouped in this cyclic list. It is not possible to have a "free place" or "free places" between two tasks in the JobRow list. The method described below simply provides for the execution of the first task to be executed (followed with the index r_index) and for stacking the tasks which arrive in the JobRow list of tasks with the help of the w_index list. Access to the shared memory, notably for managing the r_index and w_index indexes, implements a mutex mechanism using the variable of the same name and the Test And Set function.

Thus, the first step, step a1 of FIG. 3, provides for the execution of a Test And Set function on the mutex variable. This variable is representative of the state of the memory shared by all of the microprocessors of the assembly of microprocessors. The result of the Test And Set function is placed in the local variable Get. As is usual for the Test And Set function, the mutex variable therefore takes the value 1 and the Get value is equal either to 0, or to 1.

In step a2, if the Get value is not equal to 0, the process returns to step a1, this is carried out until the shared memory is accessible and therefore the Get value is equal to 0.

In step a3, the Get value is re-initialized at 0 (optional) and the variable r_index is compared with the variable w_index. In fact, it these two variables are equal, this signifies that the list of tasks is empty. If this is the case, the method then follows the left hand branch of the algorithm shown in FIG. 3 which corresponds to the execution of the tasks. The right hand branch (separation at the level of step a4) relates to the stacking of tasks in the list of tasks.

The following description firstly describes the left hand branch (steps b1 to b7) and then the right hand branch of the algorithm shown in FIG. 1.

In the first step (step b1) of the left hand branch, the current task Job is copied into the JobRow list of tasks in position w_index. Moreover, the variable w_index is incremented by one unit. As already mentioned, this incrementing is carried out modulo RowSize. Because of this, when w_index must take the value RowSize, it takes the value 0.

As the index w_index has now been modified, the memory can be released and the mutex value put to 0 in step b2. The task which is in the JobRow list of tasks in position r_index is then executed (step b3).

As before, for the method described with reference to FIG. 1, once the task is completed, the position index r_index can be incremented. However, it is here necessary to ensure that access to the shared memory is available. Therefore, in step b4, a Test And Set function is carried out on the mutex variable. As already suggested previously, for the method illustrated in FIG. 1, it is useless to choose an additional local variable. The variable Get is used again here. As long as this Get variable is equal to 1, that is to say as long as the shared variable is used by another resource, there is a return to step b4. However, when the memory becomes accessible, Get then takes the value 0 and it is possible to go on to step b6 which provides for incrementing the index r_index by one unit.

Once the index r_index is incremented, it is again compared with the index w_index. If these two indexes are equal, that is to say if the list of tasks is empty, the program can be completed. However, before leaving the program, provision is made, in step a5, to free access to the shared memory by giving the value 0 to the mutex variable.

In the contrary case (r_index different from w_index, in step b7), there is a return to step b2 in order to carry out the next task.

The left hand branch of the algorithm shown in FIG. 3 now having been described, the continuation of the description will relate to the right hand branch of this algorithm.

The value of the variable (w_index+1) is then compared with the value of the variable r_index (modulo RowSize of course). If these values are equal, the value 1 is assigned to the local variable Get in step d1; this makes it possible to see that the list of tasks is filled. It is also possible to use the local variable Get here and not to define a special local variable since this variable Get will be reset to 0 after execution of a task by the method (or when a new task is added to the list of tasks).

In step c1, if the list of tasks JobRow is not full, the current task Job is then entered in the JobRow list in position w_index. Once this writing is complete, the index w_index can be incremented by one unit.

With the task being correctly stacked and the indexes updated, the program can be terminated. However, in order to free access to the shared memory, step a5 re-initializing the variable mutex to the value 0 is carried out.

The method corresponding to the algorithm shown in FIG. 3 is not blocking. It never results in putting a microprocessor potentially infinitely on hold. It is certain that such a blocking is avoided if all of the processors use the variable mutex relating to the shared memory solely with this algorithm (FIG. 3).

In this way, if a microprocessor has a task to execute by accessing shared data, it will put this task in the list of tasks and it or another microprocessor will execute this task subsequently when the shared resource becomes available.

The described algorithm has the feature that if several microprocessors share a common resource, and because of this a same list of tasks, then when task execution is required, it is not possible to know which microprocessor will execute it. However, this algorithm guarantees that the task will be executed by one of the microprocessors sharing the resource as soon as possible, using management of the "FIFO" type.

The present invention is not limited to the methods described above as non-limitative examples. It relates to all of the variant embodiments of such methods in the context of the following claims. This invention also relates to a microprocessor allowing the implementation of a method such as described above.

The invention claimed is:

1. A method for managing the processing of tasks in a microprocessor, characterized in that it comprises steps for the management of a first list and of a second list:

in that the first list is a list containing elements giving an indication of a task to be carried out by the microprocessor, in that the second list is a list of variables representative of a state, each variable of the second list being associated with only one element of the first list and able to take a first value representative of a first state and a second value representative of a second state, in that a global variable is defined, this global variable being able to take as many separate values as there are elements in the second list, said global variable pointing to a variable in the first list and in the second list, in that said global variable is a variable intended to be incremented in such a way as to point to the elements of the first list and of the second list in a given order, the first list and the second list being considered as circular lists, that is to say that in said given order the first element of the first and second list is considered as the element following the last element of the first and second list and, conversely, the last element of the first and second list is considered as the element preceding the first element of the first and second list, in that the first step of the method, when a task called a current task is assigned to the microprocessor, consists in reading the variable of the second list pointed to by the global variable, in copying the read variable into a first local variable and in writing in the second list, in place of the read variable, the variable of the second list taking the second value representative of the second state, this first step forming a single operation, called Test And Set and which cannot be interrupted and comprising the following steps:

reading the variable of an element in the second list in question, storing the read variable in a local memory, assigning a predetermined value to the element in the second list that has just been read, in that said method implements a first sub-method in the case where the first local variable has taken the first value representative of the first state and a second sub-method in the case where the first local variable has taken the second value representative of the second state, in that the first sub-method comprises the following steps:

3a) updating the first list such that the element corresponding to the first local variable gives an indication corresponding to the current task, 4a) the variable of the second list preceding the variable corresponding to the global value is set to the first value representative of the first state, 5a) executing the current task, 6a) incrementing the global variable, in that after step 6a), the first sub-method returns to step 4a) if the second value of the second list corresponding to the incremented global variable is representative of the second state, and the method is terminated if not, in that the second sub-method comprises the following steps:

3b) initializing a second local variable at a value 1, this second local variable being intended to be used for incrementing the global variable, 4b) executing the Test And Set operation on the variable of the second list corresponding to the global variable incremented by the value of the second local variable, the read second value being copied into a third local variable and the second value representative of the second state being taken by the element of the second list corresponding to the global variable incremented by the value of the second local variable, 5b) test on the third local variable and executing a step 6b) consisting in updating the first list such that the variable corresponding to the global variable incremented by the second local variable gives an indication corresponding to the current task and then the end of the method for managing tasks insofar as the result of the test on the third local variable indicates the first value representative of the first state, in the contrary case an incrementing of the second local variable is carried out followed by a return to step 4b) provided that the value of the second local variable is strictly less than a limit value corresponding to the number of elements of the second list reduced by 1, and end of the method with loss of the current task if this limit value is exceeded by the second local variable.

2. The method as claimed in claim 1, characterized in that the third local variable is merged with the first local variable.

3. The method as claimed in claim 1, characterized in that the variables of the second list are Boolean variables.

4. A method for managing the processing of tasks in an assembly of at least two microprocessors, characterized in that each microprocessor uses a method for managing tasks as claimed in claim 1.

5. The method as claimed in claim 4, characterized in that a shared memory is accessible by each microprocessor of the assembly in question, in that a list of tasks common to the assembly of microprocessors is defined, in that the list of tasks is managed in a FIFO manner, that is to say that a first task inputted into the first and second list is the first task executed, in that two indexes are defined in common for the assembly of microprocessors, a first index indicating which task is a next task to be executed and a second index indicating the location in the list of tasks which will have to be occupied by the next task inputted into the list of tasks to be carried out, the management of the list of tasks being carried out in a cyclic manner, in that the being accessible to the shared memory is managed by a mutex mechanism defining a variable whose value is representative of the state of the shared memory and using the Test And Set function executed on the variable by the mutex mechanism, the Test And Set function being a function that cannot be interrupted and comprising the following steps:

reading the value of the variable by the mutex mechanism, storing the read value in a local memory, assigning a predetermined value to the variable by the mutex mechanism that has just been read.

6. The method for managing the processing of tasks in an assembly of at least two microprocessors, characterized in that each microprocessor uses a method for managing tasks as claimed in claim 2.

7. A computer program stored on a non-transitory data medium, said program comprising instructions allowing the implementation of a method for managing tasks as claimed in claim 1, when that program is loaded and executed by a data processing system, such as a microprocessor.

8. A microprocessor, characterized in that it comprises instructions of a program allowing the implementation of a method for managing tasks as claimed in claim 1.

9. The microprocessor as claimed in claim 8, characterized in that the variables of the second list are Boolean variables.

10. The microprocessor for managing the processing of tasks in an assembly of at least two microprocessors, characterized in that each microprocessor uses a method for managing tasks as claimed in claim 8.

* * * * *